(No Model.)
W. E. HERSHBERGER.
FILTERING APPARATUS.
No. 455,620. Patented July 7, 1891.
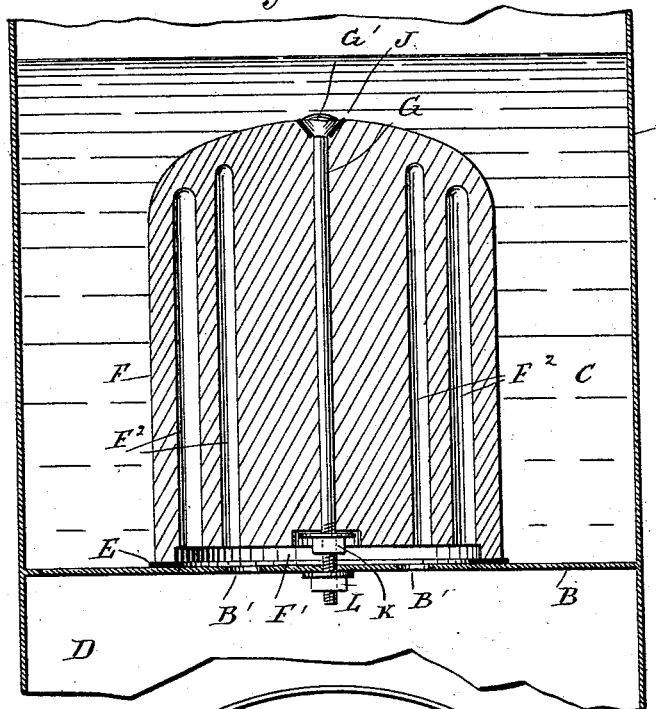
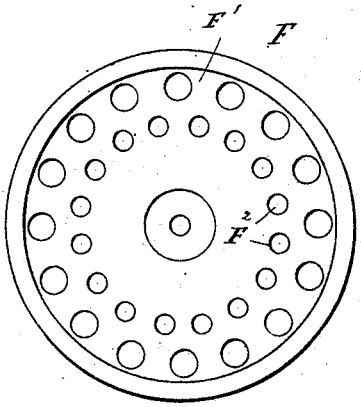
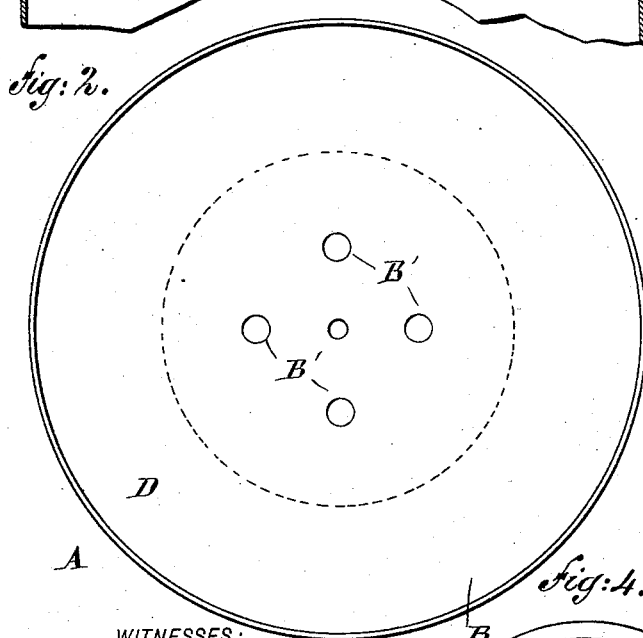
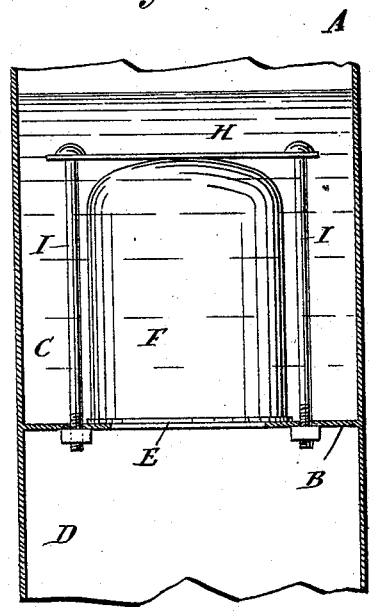
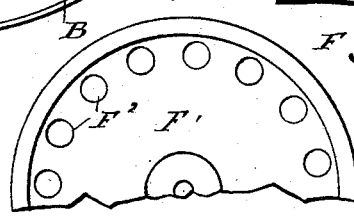
WITNESSES:
Chas. Nida.
C. Sedgwick
INVENTOR:
W. E. Hershberger
BY Munn & Co.
ATTORNEYS
THE NORRIS PETERS CO., PHOTO-LITHO., WASHINGTON, D. C.

UNITED STATES PATENT OFFICE.

WILLIAM E. HERSHBERGER, OF NEOSHO, MISSOURI.

FILTERING APPARATUS.

SPECIFICATION forming part of Letters Patent No. 455,620, dated July 7, 1891.

Application filed January 24, 1891. Serial No. 378,904. (No model.)

*To all whom it may concern:*

Be it known that I, WILLIAM E. HERSHBERGER, of Neosho, in the county of Newton and State of Missouri, have invented a new and Improved Filtering Apparatus, of which the following is a full, clear, and exact description.

The object of the invention is to provide a new and improved filtering apparatus which is simple and durable in construction, more specially designed to purify water used for drinking or other purposes and readily adapted to a suitable vessel.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a sectional side elevation of the improvement as applied. Fig. 2 is an inverted plan view of the vessel. Fig. 3 is an inverted plan view of the filtering-block. Fig. 4 is a like view of a modified form of the filtering-block, and Fig. 5 is a sectional side elevation of a modified form of the improvement, the filtering-block being shown in elevation.

The improved filtering apparatus is provided with a suitably-constructed vessel A, having a transverse partition B, which divides the vessel into an upper compartment C, containing the water to be filtered, and into a lower compartment D, from which the filtered water is drawn off to be used.

On top of the partition B is placed a rubber gasket E, on which is placed a filtering-block F, made of a porous material, preferably of Tripoli stone. The shape of the block is preferably cylindrical, the top being rounded off, as is plainly illustrated in Figs. 1 and 5. The block is secured to the partition B, preferably by a bolt G, as shown in Fig. 1, or by a cross-piece H, passing over the top of the block and connected by two bolts I with the partition B. (See Fig. 5.) In case the bolt G is used it is passed centrally through the block, the head G' of the bolt resting on a rubber gasket J, arranged in a recess in the top of the block to make a water-tight joint. A nut K screws on the threaded lower end of the bolt G to abut against a washer resting on the under side of the block F, so as to draw the head G' firmly in contact with the rubber gasket J to prevent leakage. The threaded end of the bolt G extends through an opening in the partition B, and a nut L screws on the extreme lower end of the bolt against the under side of the partition B, so as to draw the block F firmly onto the rubber gasket E, to make a water-tight joint between the block and the partition B. In the under side of the block is formed a recess F', from which lead upwardly one or more rows of recesses or passages $F^2$, as shown in Figs. 3 and 4, terminating near the upper end of the block, as is plainly shown in Fig. 1. In the partition B and within the space inclosed by the gasket E are formed one or more apertures B', through which the water passes to the discharge-compartment.

When the several parts are in place, as illustrated in Fig. 1, and the water to be filtered is passed into the upper compartment C, then the water can filter through the filtering-block F until it reaches the recesses or passages $F^2$, from which the purified water flows readily downward into the recess F', to drop onto the partition B, from which the water can readily flow through the openings B' into the discharge-compartment D. The filtering-block F, provided with a large number of passages $F^2$, permits a large quantity of water to readily filter through it to reach the said passage-ways, which act as discharges and carry off the purified water.

When it is desired to clean the filtering-block, the operator simply unscrews the nut L, then lifts out the filtering-block and cleans the same. As perfect water-tight joints are made between the filtering-block and the partition B, as well as between the block and the bolt G, no impure water can pass from the upper compartment to the lower one.

Having thus fully described my invention, I claim as new and desire to secure by Letters Patent—

1. The filtering-block F, having a recess F' in its lower face, a series of vertical passages $F^2$, leading upward therefrom and closed at their upper ends, and a central bolt-passage leading through the block from end to end, substantially as set forth.

2. The combination, with a vessel having a series of apertures in its bottom or partition, of a filtering-block having a recess in its lower face, forming a flange resting on said partition or bottom beyond its openings, a series of passages leading upward into the block from said recess, and means for securing the block in place, substantially as set forth.

3. In a filtering apparatus, the combination, with a vessel provided with a transverse partition having perforations, of a gasket set on top of the said partition and inclosing the said perforations, a filtering-block set on top of the said gasket and formed in its under side with a recess, and passages leading upwardly from the said recess within the said block to carry the water through the perforations in the said partition, and a bolt passed centrally through the said block for fastening the latter to the said partition, substantially as shown and described.

4. In a filtering apparatus, the combination, with a vessel provided with a transverse partition having perforations, of a gasket set on top of the said partition and inclosing the said perforations, a filtering-block set on top of the said gasket and formed in its under side with a recess, and passages leading upwardly from the said recess within the said block to carry the water through the perforations in the said partition, a bolt passed centrally through the said block for fastening the latter to the said partition, and means, substantially as described, for forming a water-tight joint between the said block and bolt, as set forth.

WILLIAM E. HERSHBERGER.

Witnesses:
J. R. SMITH,
D. H. KIRK.